(12) United States Patent  (10) Patent No.: US 7,594,630 B2
Ternus et al. (45) Date of Patent: Sep. 29, 2009

(54) MOUNTING FIXTURE FOR A PERIPHERAL DEVICE

(75) Inventors: John P. Ternus, Palo Alto, CA (US);
Eric Knopf, Mountain View, CA (US);
Sean Corbin, Menlo Park, CA (US);
Daniele De Iuliis, San Francisco, CA (US); Shin Nishibori, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 10/877,217

(22) Filed: Jun. 25, 2004

(65) Prior Publication Data

US 2005/0284993 A1  Dec. 29, 2005

(51) Int. Cl.
*G02B 5/08* (2006.01)
(52) U.S. Cl. ................................ 248/206.5; 248/918
(58) Field of Classification Search .............. 248/206.5, 248/918
See application file for complete search history.

(56) References Cited

U.S. PATENT DOCUMENTS

| | | | | |
|---|---|---|---|---|
| 3,223,898 A * | 12/1965 | Bey | ........................... | 335/295 |
| 4,401,960 A * | 8/1983 | Uchikune et al. | ........... | 335/285 |
| 5,125,134 A * | 6/1992 | Morita | ......................... | 24/303 |
| 5,589,985 A * | 12/1996 | Heller et al. | ................. | 359/608 |
| 5,868,346 A * | 2/1999 | Cobos | ........................ | 242/593 |
| 5,873,486 A * | 2/1999 | Morgan | ...................... | 220/739 |
| 5,940,229 A * | 8/1999 | Baumgarten | ................. | 359/839 |
| 6,477,749 B1 * | 11/2002 | Reiter | ........................ | 24/303 |
| 6,553,626 B2 * | 4/2003 | Coburn | ........................ | 16/386 |
| 6,739,567 B1 * | 5/2004 | Curtis | ......................... | 248/548 |
| 6,763,734 B2 * | 7/2004 | Shukla et al. | ............ | 73/864.01 |
| 7,039,309 B2 * | 5/2006 | Hsiao | .......................... | 396/85 |
| 2003/0161142 A1 * | 8/2003 | Kotovsky | .................... | 362/147 |

* cited by examiner

*Primary Examiner*—Amy J Sterling
*Assistant Examiner*—Steven Marsh
(74) *Attorney, Agent, or Firm*—Sawyer Law Group P.C.

(57) ABSTRACT

A mounting fixture for a computer peripheral is disclosed. The fixture comprises a mounting member adapted to be coupled to the peripheral; and a magnet coupled to the mounting member. The magnet couples the fixture to a housing. Accordingly, a mounting fixture is provided which can easily be adapted to a variety of peripheral devices to allow for their attachment to a computer or the like. By utilizing a magnet with a mounting member, a peripheral can easily and securely be mounted on the computer with minimal modification thereof.

7 Claims, 4 Drawing Sheets

MOUNTING FIXTURE FOR A PERIPHERAL DEVICE

FIELD OF THE INVENTION

The present invention relates generally to a peripheral device and more particularly to a mounting fixture for a computer peripheral.

BACKGROUND OF THE INVENTION

In many applications, a peripheral device is mounted on a computing device for a variety of reasons. For example, a camera can be mounted on the display of the computer peripheral to allow for its use as part of the computer system. One example is the iSight™ camera manufactured by Apple Computer, Inc., which is mounted on the external housing of the display typically.

The mounting in the conventional system is provided with a tape of some sort which allows the mounting fixture for the camera to be coupled to the display of the computer. The problem with this type of mounting fixture is that the tape provides a bad appearance and tape is usually a more permanent attachment that can damage surfaces when removed. Therefore, it is desirable to provide a method and system for mounting the camera or other peripheral device to a computing device that is less permanent than the conventional tape mounted fixture. The mounting fixture should be easily implemented, cost effective and adaptable to existing systems. The present invention addresses such a need.

SUMMARY OF THE INVENTION

A mounting fixture for a computer peripheral is disclosed. The fixture comprises a mounting member adapted to be coupled to the peripheral; and a magnet coupled to the mounting member. The magnet couples the fixture to a housing. Accordingly, a mounting fixture is provided which can easily be adapted to a variety of peripheral devices to allow for their attachment to a computer or the like. By utilizing a magnet with a mounting member, a peripheral can easily and securely be mounted on the computer with minimal modification thereof.

DETAILED DESCRIPTION

The present invention relates generally to a computer peripheral and more particularly to a mounting fixture for a computer peripheral. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A mounting fixture in accordance with the present invention utilizes a magnet for positioning a computer peripheral on a display. In one embodiment, its external housing is a ferromagnetic material, and accordingly the camera can then be placed anywhere on the display. In another embodiment where the external housing is not ferromagnetic, i.e., plastics or anodized aluminum, a ferromagnetic strip or ferromagnetic material may be exposed for guidance on the under surface of the housing. In a final embodiment, a desired mounting position can be provided by placing the metal plate or a magnet in a particular position to provide for the desired mounting position.

To describe the present invention in more detail, refer now to the following description in conjunction with the accompanying figures.

Figure 1:
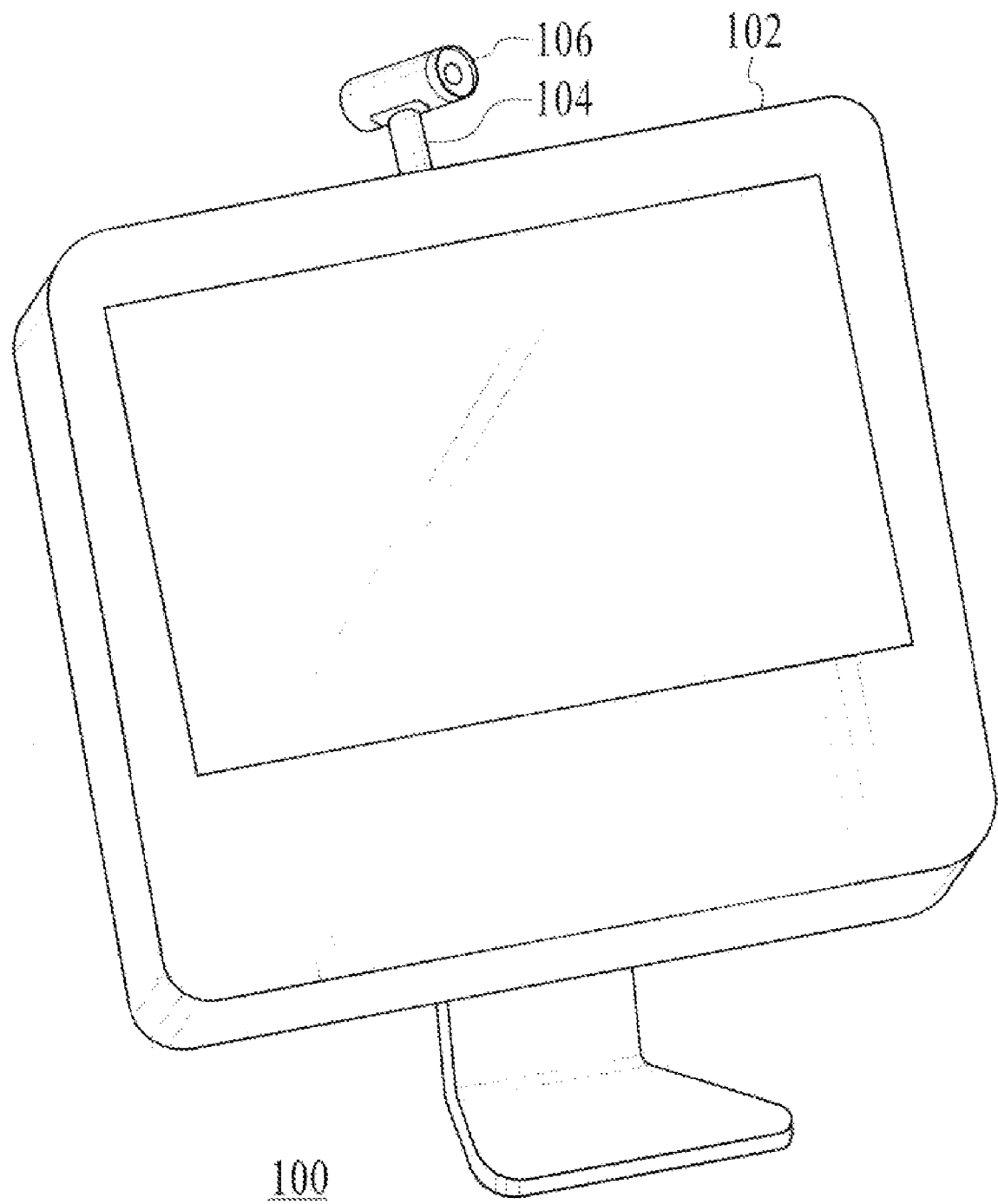
FIG. 1 is a perspective view of a mounting fixture on a display panel in accordance with the present invention.

FIG. 1 is a perspective view of a mounting fixture on a display panel in accordance with the present invention. As is seen, a display panel 100 has a housing 102 surrounding it in which the mounting fixture 104 is placed thereon. A camera 106 fits on top of the mounting fixture 104 in this embodiment is shown, although one of ordinary skill in the art recognizes that any peripheral device could be attached to the mounting fixture 104, including but not limited to a microphone, a digital cameral, a telephone, a printer or any other peripheral.

Figure 2:
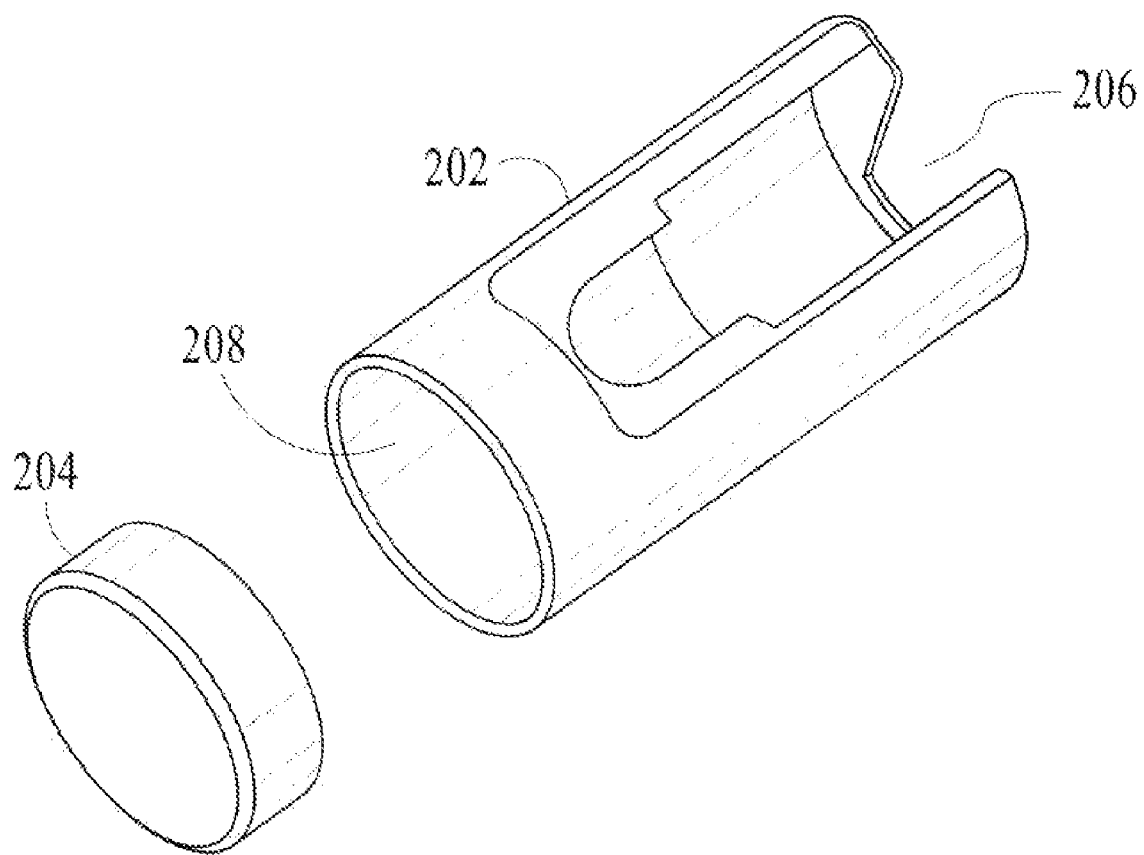
FIG. 2 illustrates in an exploded view the mounting fixture in accordance with the present invention.

FIG. 2 illustrates in an exploded view the mounting fixture 104 in accordance with the present invention. The mounting fixture 104 includes a mounting member 202 and a magnet 204. The mounting member 202 in this embodiment is cylindrical in shape and includes a top aperture 206 for receiving and holding the camera and a bottom aperture 208 for receiving and holding the magnet when placed on the housing of the display.

Figure 3:
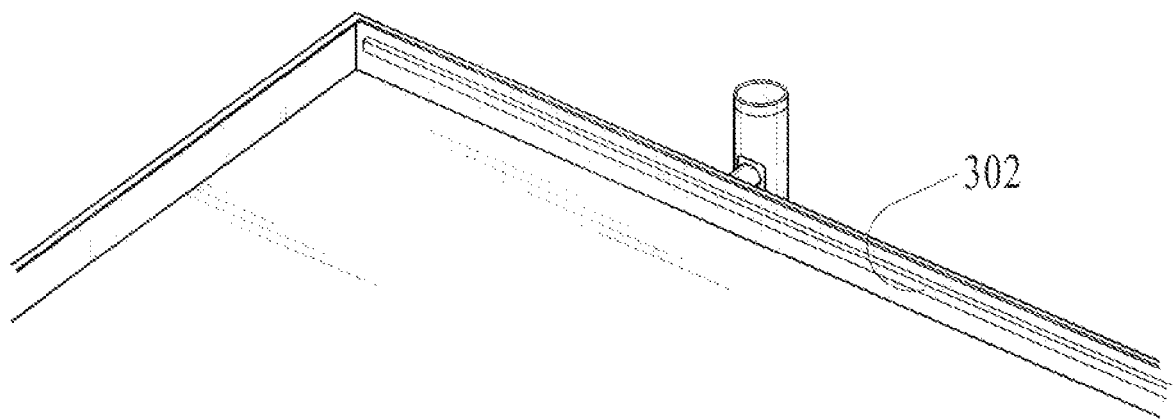
FIG. 3 illustrates another embodiment of the mounting fixture in which a steel strip or ferromagnetic material may be exposed for guidance on the under surface of the housing.
Figure 4:
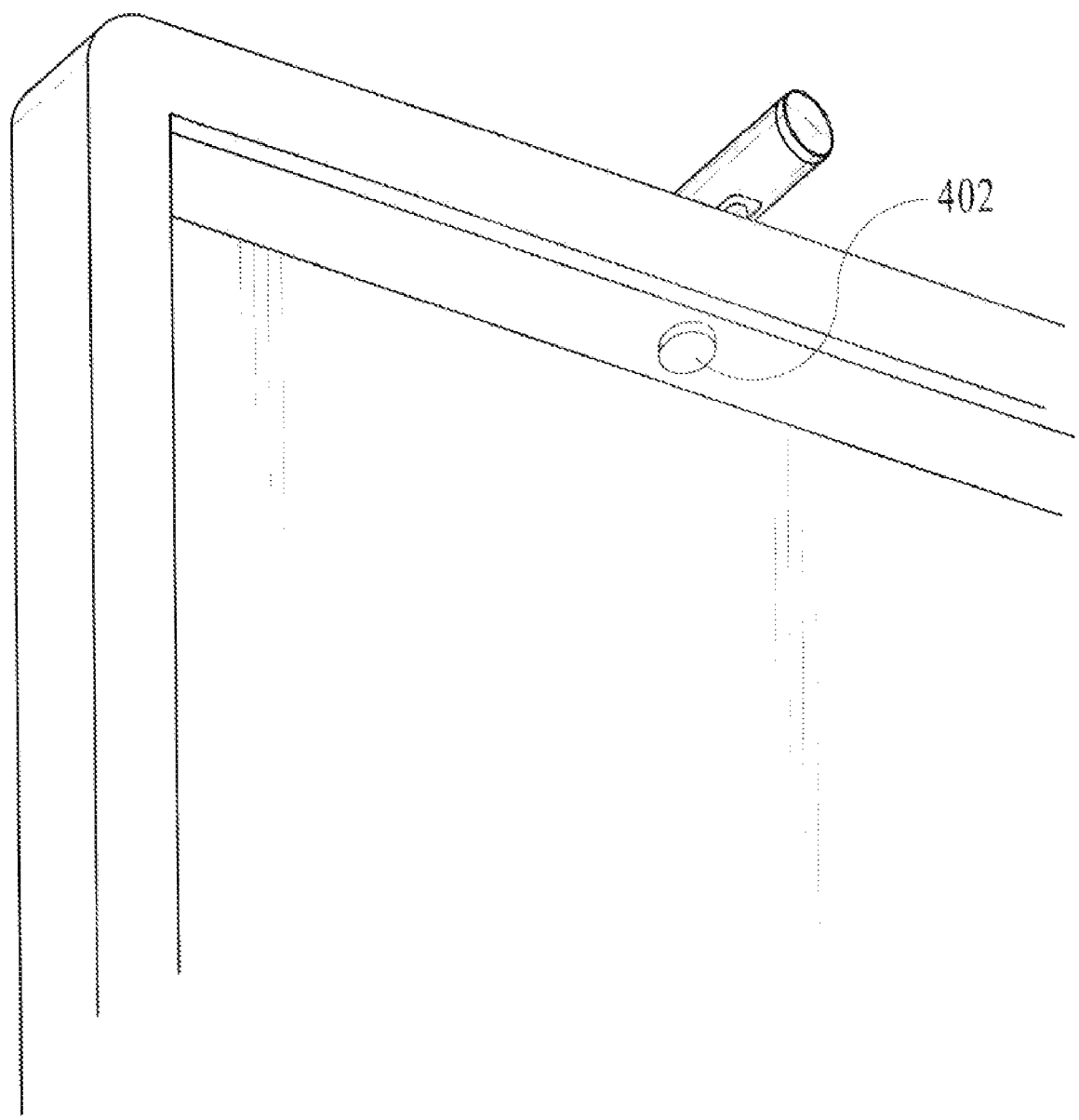
FIG. 4 illustrates a final embodiment of the mounting fixture in which a desired mounting position is provided by placing a magnetic surface in a particular position.

The mounting fixture 104 can be attached to the housing of the display in a variety of ways. For example, in one embodiment, the external can be a ferromagnetic material, and accordingly the camera can then be placed anywhere on the display. In another embodiment where the external housing is not ferromagnetic, (i.e., plastics or anodized aluminum), a ferromagnetic strip 302 or magnetic material may be exposed for guidance on the tinder surface of the housing as shown in FIG. 3. In a final embodiment, a desired mounting position can be provided by placing a magnetic surface in a particular position to provide for the desired mounting position as shown in FIG. 4. In so doing, the locus of the mounting position is located by the magnetic surface in the housing. In addition, the mounting fixture could include metal strips or taps that are internal to the housing for guiding and/or positioning a peripheral device. Also, it would be possible to include metal strips or tabs internal to the housing for any peripheral device with a metallic base.

Accordingly, a mounting fixture is provided which can easily be adapted to a variety of peripheral devices to allow for their attachment to a computer or the like. By utilizing a magnet with a mounting member, a peripheral can be easily and securely mounted on the computer with minimal modification thereof.

Although the present invention has been described in accordance with the embodiments shown, one of ordinary skill in the art will readily recognize that there could be variations to the embodiments and those variations would be within the spirit and scope of the present invention. For example, although a cylindrical mounting member and a cylindrical magnet are disclosed herein. These elements can be of any shape and they would still be within the spirit and scope of the present invention. Accordingly, many modifications may be made by one of ordinary skill in the art without departing from the spirit and scope of the appended claims.

What is claimed is:

1. A system comprising:
   a camera;
   a display monitor;
   a mounting fixture, the fixture further comprising a magnet wherein the magnet is cylindrical, the magnet for coupling the fixture to the display monitor; and
   a mounting member coupled to the camera and the magnet; wherein the mounting member comprises a cylindrical member, the cylindrical member including a top aperture and a bottom aperture, the top aperture for holding the camera and the bottom aperture for holding the magnet, the mounting member being made of plastic.

2. A mounting system for a peripheral device to be coupled to a display monitor, the system comprising:
   a peripheral device;
   a display monitor, wherein the display monitor contains a ferromagnetic material, and wherein the ferromagnetic material is concealed from view; and
   a fixture for coupling the peripheral device to the display monitor via the ferromagnetic material, the fixture comprising:
   a cylindrical member, the cylindrical member comprising:
      a top aperture for holding the peripheral device;
      a bottom aperture which serves as a housing;
      a magnet wherein the magnet is cylindrical and positioned in the housing of the bottom aperture of the cylindrical member to couple the fixture to the ferromagnetic material within the display monitor and wherein the cylindrical member is made of plastic, and conceals the magnet and magnet housing from view once attached to the display monitor.

3. The mounting system of claim 2 wherein the peripheral device comprises a camera.

4. The system of claim 1, wherein the display monitor is ferromagnetic.

5. The system of claim 1, wherein the display monitor includes a magnetic area.

6. The system of claim 5, wherein the magnetic area comprises a ferromagnetic strip on the interior of the display monitor.

7. The system of claim 6, wherein the ferromagnetic strip is the locus of the mounting position for the fixture.

* * * * *